June 14, 1932.　　　　　J. H. STROCK　　　　　1,863,034

REAMER AND REAMER CHUCK FOR PIPE THREADING DEVICES

Filed April 23, 1930　　2 Sheets-Sheet 1

INVENTOR
J. H. STROCK
BY *Hazard and Miller*
ATTORNEYS

June 14, 1932.  J. H. STROCK  1,863,034
REAMER AND REAMER CHUCK FOR PIPE THREADING DEVICES
Filed April 23, 1930   2 Sheets-Sheet 2
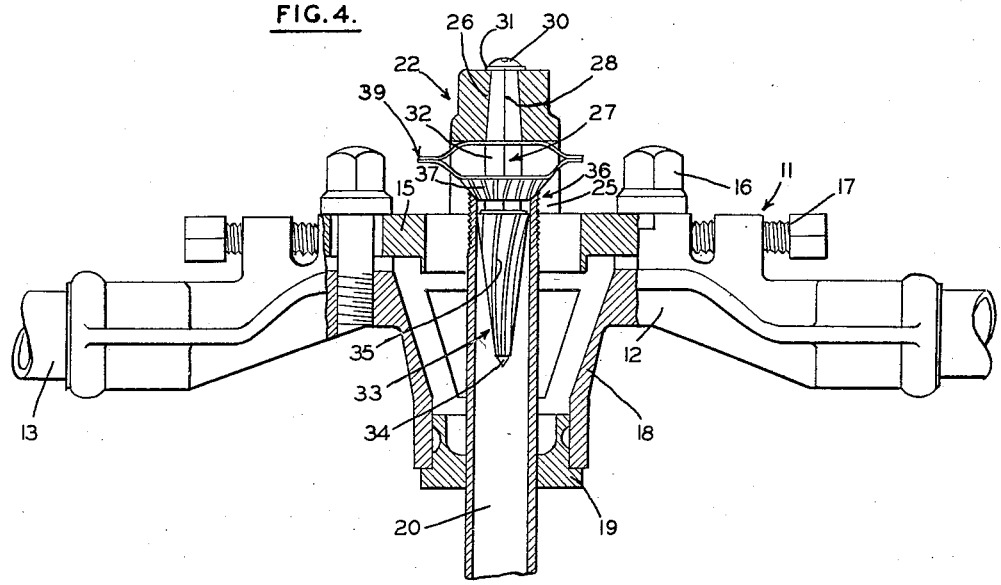
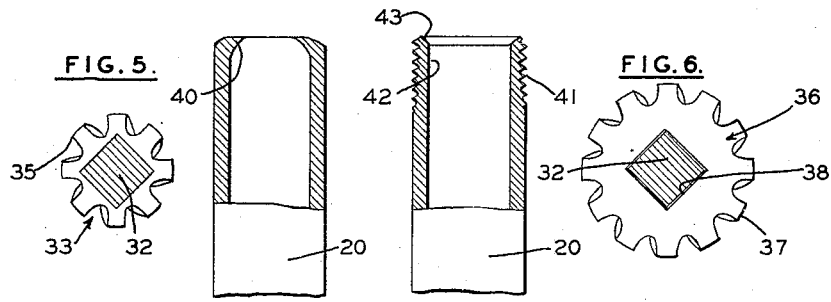
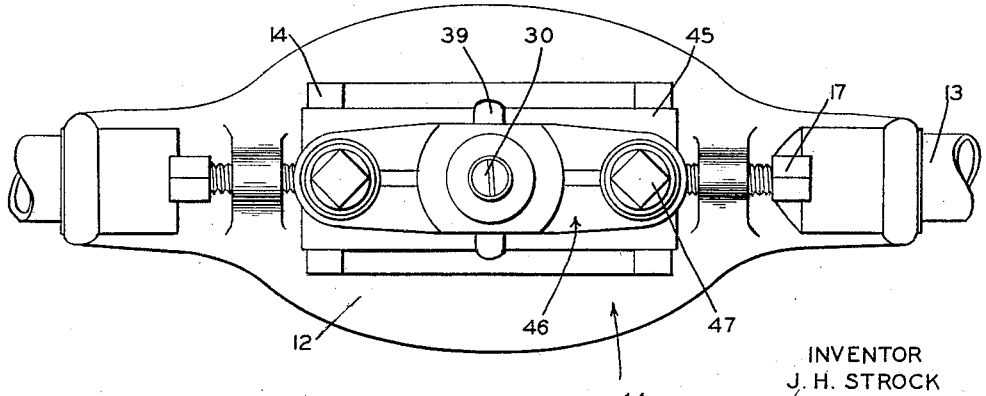
INVENTOR
J. H. STROCK
BY Hazard and Miller
ATTORNEYS Patented June 14, 1932

1,863,034

UNITED STATES PATENT OFFICE

JOSEPH HENRY STROCK, OF LOS ANGELES, CALIFORNIA

REAMER AND REAMER CHUCK FOR PIPE THREADING DEVICES

Application filed April 23, 1930. Serial No. 446,593.

My invention has to do with a reamer and a reamer chuck suitable for pipe threading devices in which the pipe may be reamed at the same time it is threaded.

When pipes, such as water, gas, or electric conduit pipes are cut into various lengths for the purpose of threading the ends for coupling connections or the like, the cutting tool usually forms a bead or bur internally of the pipe and it has been the custom after threading of the pipes to remove this bead by a hand reamer or the like. Such reamers rarely produce a clean-cut ream, leaving the pipe of even thickness on all sides. This prior practice requires two distinct and separate operations, that is, the threading of the pipe and, subsequently, the reaming, and if a feather edge is required on the end of the threaded pipe this sometimes necessitates a third operation.

An object and feature of my invention is an arrangement of a reamer and a reamer chuck on a pipe threading machine so that simultaneously with the threading of the pipe the internal bead or bur is removed by a reaming action and also, if desired, as a finish operation in the pipe threading, the end of the pipe is given a further reaming out to form a feather or beveled edge.

A further object of my invention is the construction of a pipe threading device with a reamer mounted in the axial center so that it will be centered in the pipe and ream the bur formed on the interior of the pipe at the end while the pipe is being threaded in the threading chaser or dies and, further, has a continuing operation bringing a second reamer into operation on the end of the pipe to give a feather or beveled edge. The two reamers are mounted to operate as a single unit, and a feature of the second reamer is a resilient mounting to allow this to recede against a pressure spring in the reaming of the beveled edge. Another detailed feature of the reamers is forming the cutting teeth in such a slope relative to the surface of the reamer so that the cuttings are urged outwardly toward the end of the pipe instead of inwardly of the pipe, thus maintaining the pipe clear of cuttings.

With my construction a suitable chuck to hold a reamer may be attached to a pipe threading device such as a hand operated die stock, this chuck preferably has a bridging piece with a socket to receive the stem of the reamer, thus holding the reamer in the axial center of the dies in the stock. Where the double reamer is used for giving a feather or beveled edge an upper bevel reaming tool is slidably mounted on the stem of the bur reaming tool and is held in place by a spring which operates between the second or outer reamer and the bridging piece.

My invention is illustrated in connection with the accompanying drawings in which:

Fig. 4 is a side elevation with the central part broken away to illustrate the reaming action.

Fig. 5 is a detailed section on the line 5—5 of Fig. 3 in the direction of the arrows, showing the inner or primary reamer.

Fig. 6 is a detailed section on the line 6—6 of Fig. 3 in the direction of the arrows, showing the outer or secondary reamer.

Fig. 7 is a detailed section through a pipe illustrating the bur.

Fig. 8 is a detailed section through a pipe showing the threads and the reaming cut.

Fig. 9 is a plan of a die stock having the reamer mounted in alignment with the dies or chasers.

Figure 1:
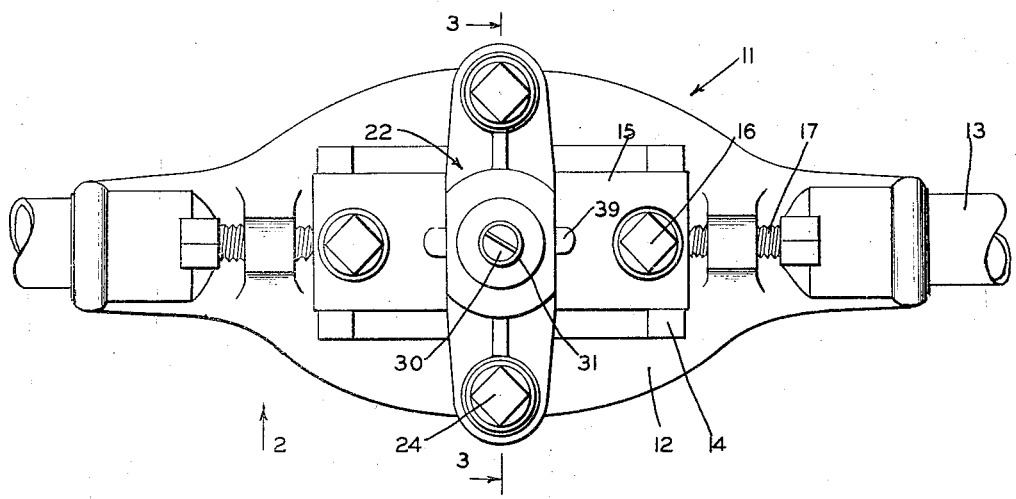
Fig. 1 is a plan taken in the direction of the arrow 1 of a hand die stock with my reamer chuck and reamer attached thereto.

In the illustrations the die stock is designated generally by the numeral 11. This has a central body structure 12 with handles 13 at opposite sides for rotating the stock. There are guides 14 in which are mounted the dies or chasers 15 for cutting the screw threads. These are illustrated as being clamped by the set screws 16 and held in adjusted position by the adjusting screws 17. The stock is illustrated as provided with the usual depending skirt 18, in which there is a centering block 19 to center the pipe indicated at 20. The construction so far described is quite standard.

Figure 2:
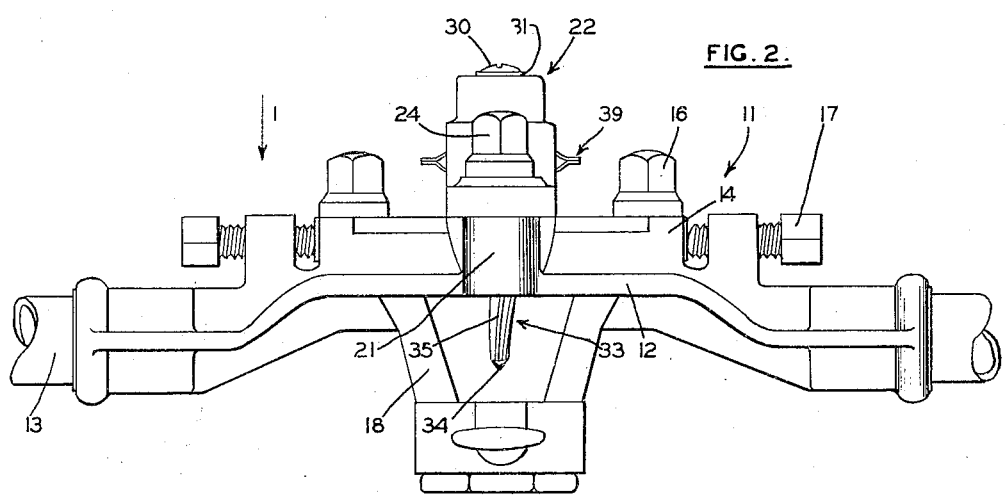
Fig. 2 is a side elevation taken in the direction of the arrow 2 of Fig. 1.
Figure 3:
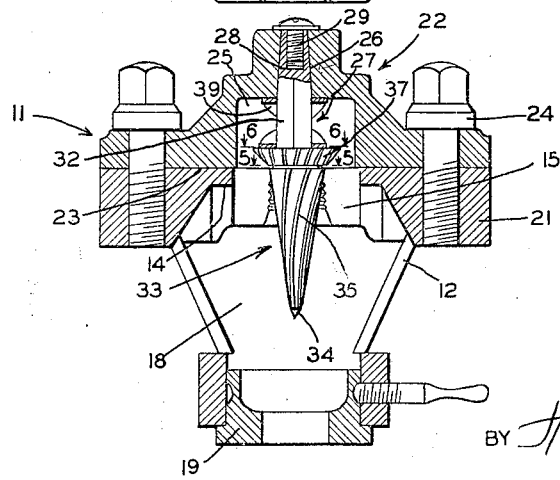
Fig. 3 is a vertical transverse section on the line 3—3 of Fig. 1 in the direction of the arrows.

In my construction as illustrated in Figs. 1 through 4 the die stock body is provided with substantial lugs 21 on opposite sides, and extending between these lugs there is a bridging piece 22. This bridging piece has a base 23 resting on the upper part of the lugs 21 and on the center part of the die stock body, and is secured to the lugs by clamping screws 24. The bridging piece has a recess 25 with a tapered, preferably squared, socket 26.

The reamer stem 27 is illustrated as squared in cross section having an upper tapered section 28 fitting in the tapered socket 26. This section at the top has a screw 29 threaded therein, the head of a screw 30 bearing on a washer 31 and, hence, drawing the stem tightly into the reamer chuck, the bridging piece forming the reamer chuck. A central section 32 of the reamer stem is formed with parallel sides.

A primary or inner reamer 33 is formed integral with the stem and is illustrated as having a point 34 and with cutting teeth 35 which are curved on the conical face of the reamer so that cuttings will tend to be forced upwardly out of the pipe instead of downwardly. The widest portion of this primary reamer is designed to form a snug fit with the interior of the pipe being threaded, and after cutting off the bur on the pipe it is not intended that this reamer cut the inside wall so that the pipe need in no wise be diminished in thickness at the threads.

The outer or secondary reamer 36 is illustrated as having a flare or bevel considerably greater than that of the primary reamer, and also has teeth 37 curved to discharge the cuttings outwardly instead of forcing these into the pipe. This reamer is indicated as having a squared opening 38 which slides on the squared section 32 of the stem of the primary reamer. This reamer is pressed downwardly by a lip type of spring 39 having an upper section bearing against the bridging piece and the lower section bearing against the secondary reamer, these sections having openings to accommodate the reamer stem.

In Figs. 7 and 8 the pipe 20 is indicated as having an interior bur or bead 40 which is usually formed during the operation of cutting the pipe. This bead varies much in size in accordance with the type and sharpness of the cutting tool used to cut the pipe. Pipe threads 41 are illustrated in the usual type, these being a tapered thread, although, if desired, a parallel thread may be formed, and the bur is reamed out of a portion 42 of the pipe adjacent the end by the inner or primary reamer, and the secondary reamer cuts the beveled edge 43, thus forming what is termed a feather edge on the end of the pipe.

The action of the reamer is substantially as follows:

The pipe is mounted in the block 19 in the usual manner and the dies cut the threads in the pipe as the die stock is rotated around the pipe. In this connection the inner or primary reamer enters the open end of the pipe and as the pipe advances this reamer cuts the bur 40 on the interior of the pipe, discharging the cuttings upwardly, which cuttings may discharge in the space between the primary and the secondary reamers. If it is not desired to give a beveled or feather cut to the pipe, the secondary reamer may be discarded and the primary reamer utilized merely to cut and remove the bead and, if desired, to be shaped to give a slight bevel on the end of the pipe.

However, where a beveled or feather edge on the end of the pipe is desired, I prefer to use the secondary reamer which is pressed by the spring 39 toward the primary reamer and is brought to bear on the end of the pipe just about at the time when the thread is almost completed. This gives the beveled edge 43 to the end of the pipe, discharging the cuttings outwardly. It will be manifest that the strength of the spring 39 may be varied in accordance with the type of pipe being threaded and beveled and with the degree of cut it is desired to make.

In the construction of Fig. 9 I illustrate a die stock 44 which may be of the same general type as shown in Figs. 1 to 4, having the die chasers 45 mounted in guides, but in this case a bridging piece 46 is secured by clamping bolts 47 which secure the dies in place. By this construction it is necessary to remove the reamer chuck which has the bridging piece when it is desired to change the dies. In accordance with the usual practice the dies may be adjusted slightly to accommodate pipes of a smaller range in size, but the construction and mounting of the reamer chuck or bridging piece maintains the reamer centered in regard to the center of the pipe.

Various changes may be made in the details of construction without departing from the spirit or scope of the invention as defined by the appended claims.

I claim:

1. In combination, a pipe threading device having a central body structure with threading dies therein and forming an aperture, a pipe guide, a pipe mounted in said guide and engageable by the said dies, said dies in the relative rotation of the pipe and the dies feeding the pipe in a forward direction, a bridging piece secured to the central structure and having a reamer fixed thereto in axial alignment with the aperture, the outside diameter of the said reamer being less than the inside diameter of the pipe, whereby in the forward movement of the pipe the reamer is forced completely into the interior of the pipe, thereby reaming a bur from the inside of the pipe, a slidably mounted reamer mounted in axial alignment with the fixed reamer and slidable relative thereto, said slidable reamer being adapted to engage the end of the pipe and form a bevel thereon.

2. In a pipe threading device having threading cutters forming an aperture, a reamer fixed in axial alignment with the aperture and a slidable reamer in axial alignment with the fixed reamer and slidable relative thereto, the fixed reamer being adapted to ream the interior of a pipe on advancement of the pipe through the threading device, and the slidable reamer being adapted to ream the end of the pipe.

3. In a pipe threading device having threading cutters forming an aperture, a reamer having a stem and a mounting to hold the reamer fixed in axial alignment with the aperture, a secondary reamer slidably mounted on the stem, the fixed reamer cutting the interior of the pipe when fed over said reamer, and the secondary reamer reaming the end of the pipe.

4. In a pipe threading device having threading cutters forming an aperture, a reamer chuck secured to said device and having a reamer stem mounted therein, a fixed primary reamer secured to the stem, the said reamer being in axial alignment with the aperture, a secondary slidable reamer mounted on the stem and slidable in reference to the primary reamer and having a spring operating between the secondary reamer and the chuck, the threading cutters being adapted to advance the pipe in the threading operation over the fixed primary reamer and to force the end of the pipe into contact with the secondary slidable reamer.

5. In a pipe threading device having a central body structure with threading dies forming an aperture, a bridging piece secured to said central body and having a chuck therein, with a reamer stem mounted in the chuck, and a fixed primary reamer secured to the stem, a secondary reamer slidably mounted but non-rotatable on the said stem and relative to the fixed reamer, a spring urging the secondary toward the primary reamer, the said dies being adapted to advance a pipe in the threading operation over the primary reamer and to force the end of the pipe against the secondary reamer.

6. In a pipe threading device having a central body structure with adjustably mounted threading dies forming an aperture positioned opposite each other, a bridging piece removably secured to the said central body and extending across the dies, and having a central chuck opening, a reamer stem fitted in said opening and having a primary fixed reamer secured thereto, and a secondary reamer slidable but non-rotatable on the said stem and relative to the fixed reamer, a compression spring between the secondary reamer and the bridging piece, the threading dies being adapted to advance a pipe and force the open end over the fixed reamer, and thrust the end against the secondary reamer.

In testimony whereof I have signed my name to this specification.

J. H. STROCK.